(12) United States Patent
Sera

(10) Patent No.: US 6,559,913 B1
(45) Date of Patent: May 6, 2003

(54) LIQUID CRYSTAL DISPLAY DEVICE HAVING LIGHT-SHIELDING FILM AND DATA LINE OF EQUAL WIDTH AND MANUFACTURING METHOD THEREOF

(75) Inventor: Kenji Sera, Tokyo (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 09/649,111

(22) Filed: Aug. 28, 2000

(30) Foreign Application Priority Data

Aug. 30, 1999 (JP) ............................................ 11-243464

(51) Int. Cl.$^7$ ............................................ G02F 1/1333
(52) U.S. Cl. .......................................... 349/111; 349/44
(58) Field of Search ............................ 349/44, 47, 110, 349/111, 46

(56) References Cited

U.S. PATENT DOCUMENTS 6,297,862 B1 * 10/2001 Murade ...................... 349/44

FOREIGN PATENT DOCUMENTS

| JP | 8-171101 | 7/1996 | ............ G02F/1/136 |
| JP | 2000-180899 | 6/2000 | ......... G02F/1/1365 |

* cited by examiner

*Primary Examiner*—Toan Ton
*Assistant Examiner*—Andrew Schechter
(74) *Attorney, Agent, or Firm*—Hayes Soloway PC

(57) ABSTRACT

There is presented a liquid crystal display device having, on a transparent insulating substrate, an underneath light-shielding film, a thin film transistor (TFT) in which, over an interlayer film on said underneath light-shielding film, an active layer made of polysilicon, a gate insulating film and a gate electrode connected with the gate line are successively formed, a data line that feeds the data signals into said TFT, and a black matrix formed over said data line to cut off the incident light, with said active layer of the TFT being formed in the region where said gate line and data line intersect each other, wherein the underneath light-shielding film and the data line are formed to have substantially equal widths, at least, in said active-layer formation area.

9 Claims, 7 Drawing Sheets

A-A' cross-section     B-B' cross-section

LIQUID CRYSTAL DISPLAY DEVICE HAVING LIGHT-SHIELDING FILM AND DATA LINE OF EQUAL WIDTH AND MANUFACTURING METHOD THEREOF

BACKGROUND OF THE INVENTION

1. Field of the Invention

The present invention relates to a liquid crystal display device making use of a thin liquid transistor (TFT), such as a liquid crystal projector, and more particularly to improvements in light-shielding capability of an active matrix type liquid crystal display device for a light valve wherein switching of a liquid crystal is carried out through a TFT. Further, the present invention relates to a manufacturing method thereof.

2. Description of the Related Art

In recent years, as a display for the wall-hanging type television, the projective-type television or the OA appliances, various display units using a liquid crystal panel have been being developed. Among those liquid crystal panels, an active matrix type liquid crystal display wherein TFTs are included as the active element in a liquid crystal display device is the most promising to realize a high quality display unit for the OA appliances as well as a display unit for the high definition television because of its advantageous natures such as the one that an increase in number of scanning lines therein does not result in a deterioration of the contrast or the response time thereof. Especially when applied to a projection type liquid crystal display with the liquid crystal projection or the like, it allows achieving a large screen display with ease.

Normally, in the active matrix type liquid crystal display device for a light valve that is utilized for the liquid crystal projection, a small element is illuminated with a strong light, and the light passing therethrough is controlled according to the image data by turning on and off each pixel separately through switching of a liquid crystal by a corresponding TFT, and then the transmitted light, being magnified by an optical element such as a lens or the like, is projected on a screen or the like. At this, if an active layer of the TFT is formed from polysilicon (p-Si), there arises a problem of the optical leakage current in a channel section of the TFT at the off-time that may be produced, due to the optical excitation, by the reflected light from the optical system such as a lens, not to mention under the direct influence of the incident light thereon. Such an optical leakage current causes various display troubles including the appearance of streaks and flickers.

In the conventional active matrix type liquid crystal display device for a light valve of this sort, gate lines 7 and data lines 10 are arranged in the form of a matrix so as to intersect at right angles one another, as shown in FIG. 4, and in the areas demarcated with gate lines and data lines, transparent electrodes made of ITO (Indium Tin Oxide) 18 or the like, which serve as pixel electrodes, are formed, and in the regions where the gate lines 7 and the data lines 10 intersect, TFTS are provided. FIG. 5 is an enlarged view of the portion encircled in FIG. 4, showing a formation area of the TFT. On a data line 10, there is formed a contact 16 between the data line and the TFT to supply signals for a source region of the TFT. Through another contact 17 between the ITO and the TFT, a drain electrode 8 is connected with the ITO that is a pixel electrode. LDD (Lightly-Doped Drain) regions 15 are formed between a channel section (the part covered by the gate line) and source-drain regions. Further, FIGS. 6(a) and 6(b) are cross-sectional views taken on line III—III and line IV—IV of FIG. 5, respectively. In the structure shown in the drawings, there are provided an underneath light-shielding film 3 set over an underlying insulating film 2 on a transparent insulating substrate such as a glass substrate 1 or the like, and a black matrix 12 set above the TFT. Upon this, when the incident light comes from the side of an opposite substrate facing the TFT over a liquid crystal layer, the black matrix 12 cuts off the incident light and the underneath light-shielding film 3, the reflected light from the optical system.

The black matrix 12 is formed, in some cases, on the same substrate as the TFT with an interlayer film inserted therebetween as shown in FIG. 6, and, in other cases, on the opposite substrate to the TFT with the liquid crystal layer inserted therebetween. In the case that the black matrix 12 is formed on the opposite substrate to the TFT, the black matrix 12 must be made larger than the underneath light-shielding film 3 to allow 10 μm or so for a shift in the overlay accuracy between two layers of the substrates. This brings about a problem that the aperture ratio cannot be made sufficiently large.

As a result, the method in which the black matrix as a second light-shielding film is formed on the identical substrate with the TFT is mainly employed at present. In this instance, it is unnecessary to allow such a large margin as described above since a high alignment accuracy can be obtained by making a good use of a manufacturing process of a semiconductor device. However, this method pays no regard to the positioning relation among these two light-shielding films and the TFT so that measures of cutting off the light caused by diffused reflection within the panel are not satisfactory. Nevertheless, in the gate-line formation region shown in FIG. 6(b), because the underneath light-shielding film 3 as well as the black matrix 12 is formed therein, the light is well cut off. However, in the region shown in FIG. 6(a) where no gate electrode is present, or in the region positioned between two pixel electrodes, the underneath light-shielding film 3 and the black matrix 12 are both restricted in width to increase the pixel aperture ratio. Accordingly, in the regions of a channel that is made of polysilicon and separating source-drain, wherein these electrodes and the gate line do not overlap, in other words, in the LDD regions 15, an adjustment of the widths of the black matrix 12 and the underneath light-shielding film 3 is normally made so that the incident light from the edge section of the black matrix may not reflect on the surface of the underneath light-shielding film 3. Yet, this measure cannot cut off the reflected light travelling from the optical system sufficiently. The reflected light passing over the edge section of the underneath light-shielding film 3 may enter into the LDD regions 15 through a multiple reflection among the black matrix 12, the data line 10 and the underneath light-shielding film 3, and cause the current leakage. Hereat, it should be noted that the directional components of the incident light or the reflected light are not only the component parallel to the direction of the gate line as shown in this example. They include components of various directions so that there are occasions of incidence even on the channel region beneath the gate line.

As measures against the reflected light from the optical system, it is proposed, in Japanese Patent Application No. 354845/1998, that an end section of an underneath light-shielding film is made into the form of a taper and the positioning relation between the underneath light-shielding film and an overlying light-shielding film that also serves as a data line is defined. Further, in Japanese Patent Application No. 109979/1999, there is disclosed a structure in which, in the vicinity of both lateral faces of the TFT in the direction of the channel length, dummy contact holes are formed on an interlayer film that is formed over an underneath light-shielding film, and films made of a wiring material are formed around the sidewalls of the dummy contact holes, and thereby the light such as the reflected light is prevented from entering into the channel or the LDD regions.

While both of these methods are effective in their own way, both require an additional step of a manufacturing method to form their characteristic structure, and obviously there remains some room for further improvements, especially from the point of production cost reduction.

SUMMARY OF THE INVENTION

Accordingly, an object of the present invention is to provide a liquid crystal display device such as a light valve, which is, with the pixel aperture ratio thereof set as large as possible, capable to prevent a reflected light travelling especially from an optical system from entering into a channel therein, without adding an extra step of a manufacturing method thereof.

In light of the above problems, the present inventor conducted investigations into the mechanism of the multiple reflection by the data line and the black matrix, and found out that the probability of incidence of the reflected light from the optical system becomes the smallest when, in the active-layer formation area of the TFT, the data line is formed to have substantially the same width as the underneath light-shielding film.

Accordingly, the present invention relates to a liquid crystal display device having, on a transparent insulating substrate:

an underneath light-shielding film;

a thin film transistor (TFT) in which, over an interlayer film on said underneath light-shielding film, an active layer made of polysilicon, a gate insulating film and a gate electrode connected with the gate line are successively formed;

a data line that feeds the data signals into said TFT; and a black matrix formed over said data line to cut off the incident light;

with said active layer of the TFT being formed in the region where said gate line and data line intersect each other; wherein:

the underneath light-shielding film and the data line are formed to have substantially equal widths, at least, in said active-layer formation area.

Further, the present invention relates to a method of manufacturing a liquid crystal display device; which comprises the steps of forming, on a transparent insulating substrate, in succession, an underneath light-shielding film, a first interlayer film, a polysilicon that is to serve as an active layer of a thin film transistor (TFT), a gate insulating film, a gate line containing a gate electrode section, a second interlayer film, a data line, a third interlayer film and a black matrix; wherein:

the underneath light-shielding film and the data line are formed to have substantially equal widths, at least, in said active-layer formation area.

In the present invention, by forming the data line and the underneath light-shielding film to have substantially equal widths in the active-layer formation area, the probability of incidence of the reflected light from the optical system or the like becomes the lowest, and, therefore, the reduction of the optical leakage current can be achieved. Further, since the above structure can be obtained by changing only the mask pattern at the time of patterning of the data line, the steps of the manufacturing method may not become complicated, and, thus, an increase in cost for formation of the light-shielding structure can be well avoided.

DETAILED DESCRIPTION OF THE PREFERRED EMBODIMENTS

As described above, in the conventional structure, while the widths of the underneath light-shielding film and the black matrix are formed to become wider in the vicinity of the active-layer formation area in order to increase the light-shielding capability thereof, the width of the data line is formed to be substantially constant throughout, without any specific design to make the data line function as a light-shielding film.

Figure 1A:
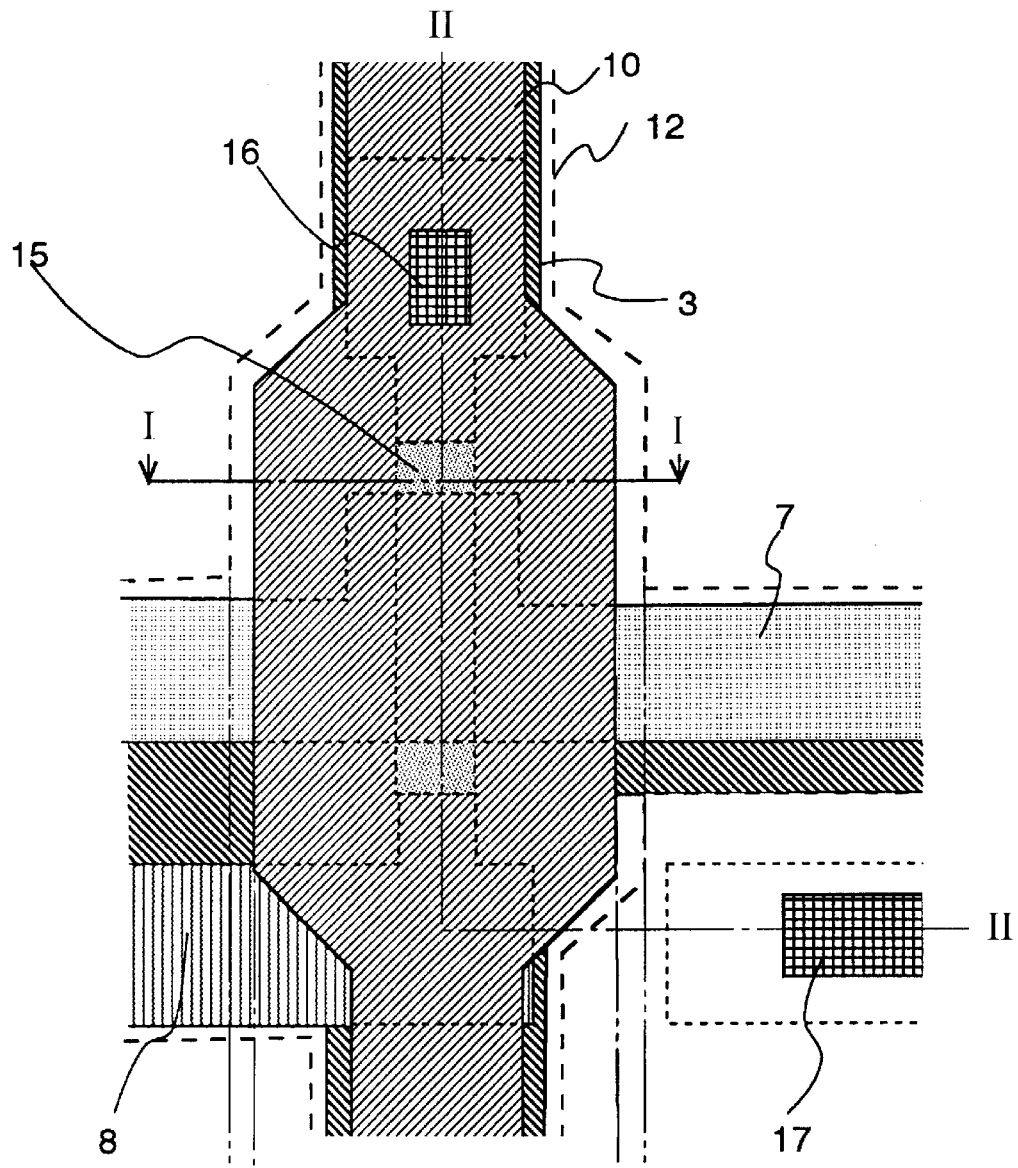
FIG. 1(a) is a plan view of a pixel structure that is one embodiment of the present invention.
Figure 1B:
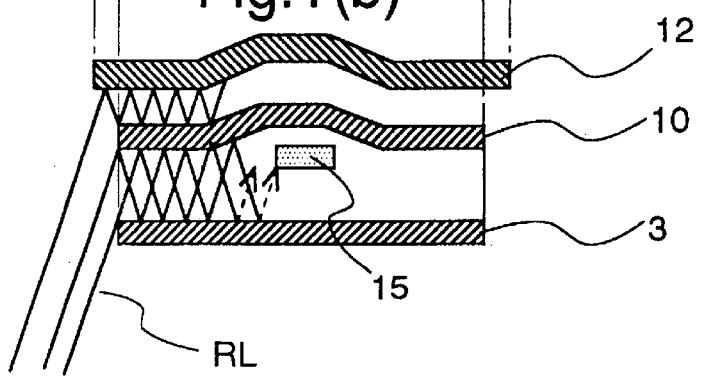
FIG. 1(b) is a schematic cross-sectional view taken along the line I–I of FIG. 1(a).

In the present invention, investigations were conducted over the effect of the data line width on the optical leakage current in the active-layer formation area of the TFT, and it was found out that the optical leakage current becomes the lowest when the width of the data line is almost the same as the width of the underneath light-shielding film. As shown in FIG. 1, if the data line 10 in the active-layer formation area of the TFT is formed to have almost the same width as the underneath light-shielding film, the reflected light incident on the black matrix cannot reach the LDD regions of the channel section, being obstructed by the data line. In this way, the lowest probability of incidence possible can be attained. When the width of the data line becomes greater than that of the underneath light-shielding film, the probability of incidence for the reflected light increases owing to the reflection on the data line. On the other hand, when the width of the data line becomes less than that of the underneath light-shielding film, the probability of incidence for the reflected light increases due to the reflection on the black matrix. Therefore, it is preferable to make the width of the underneath light-shielding film and the data line as close as possible. Now, the data line is, being formed of a metal material such as aluminum, a film that admits no transmission of the light so that it cannot be patterned in the manner of self alignment, using the underneath light-shielding film as a mask. Therefore, formation of a mask pattern is inevitably made with the standard photolithography, and using this as a mask, etching is performed, which brings about a production error to some extent. By the present technical standard, the production error for a resolution of 1 μm is approximately in the range within ±0.3 μm. In general, when the width of the data line becomes smaller (with an error of a negative value) rather than larger (with an error of a positive value) than the width of the underneath light-shielding film, the effect of diffused reflection becomes less. This can be explained as follows. When the light reflected on the black matrix travels through the section where the data line is shorter than the underneath light-shielding film, the light first comes across the underneath light-shielding film (made of, for example, WSi) which has a slightly lower reflectance, compared with the data line made of an aluminum-based material of a high reflectance. In short, the intensity of the incident light entering the channel between the data line and the underneath light-shielding film depends on whether the light first comes across the data line or the underneath light-shielding film. Accordingly, if the tolerance is in the range between −0.5 μm and +0.3 μm or so, the effect of reducing the optical leakage current that is the very object of the present invention can be obtained sufficiently.

In the light of this, there can be employed a structure in which, making allowance for the production error, the width of the data line in the active-layer formation area is designed, from the beginning, to be smaller than the width of the underneath light-shielding film, for example, by 0.1 μm or so, and thereby the probability that the width of the data line becomes greater than that of the underneath light-shielding film is well suppressed even if the error arises. In this instance, with respect to the width of the underneath light-shielding film, the actual width of the data line formed is contained in the range of approximately −0.4 μm to +0.2 μm. Giving consideration to the above-mentioned range of tolerance that reaches down only to −0.5 μm, the amount of the width that can be deliberately reduced is 0.2 μm or so at maximum. The present invention is, in any event, devised to make the difference between the widths of the underneath light-shielding film and the data line in the active-layer formation area of the TFT mentioned above as small as possible in formation, and, certainly, the actual amount of the difference will be further reduced as the production techniques advance.

As the width of the underneath light-shielding film in the active-layer formation area of the TFT varies with the thickness of an interlayer insulating film formed between the underneath light-shielding film and a polysilicon layer that is to serve as a channel, it cannot be defined specifically, but the distance between an end section of the TFT active layer in the direction of the channel width to an end section of the underneath light-shielding film is set preferably not less than 1.0 μm, and more preferably not less than 1.5 μm. The maximum can be appropriately chosen according to a prescribed aperture ratio.

As for the material of the underneath light-shielding film, any material that can cut off the reflected light sufficiently can be utilized. Nevertheless, in the case that a conductive material such as tungsten silicide (WSi) is employed, it is preferable that a contact is formed outside of the display area, for example, in the periphery of the substrate and through this contact, the electrical potential of the underneath light-shielding film is defined to a given potential such as the ground potential so as to reduce an adverse effect on the TFT, which may be brought about otherwise.

Further, regarding as the width of the black matrix in the active-layer formation area of the TFT, it is sufficient if it can cut off the incident light travelling directly from the light source. The black matrix can be formed so as to become wider than the underneath light-shielding film on both sides by 0.5–1 μm or so for a side. For the material to constitute the black matrix, it is generally preferable to use a metal material such as aluminum for its simplicity.

Referring to examples, the present invention is described in detail below. However, it is to be understood that these examples are given solely for the purpose of illustration and not of limitation. Further, in the accompanying drawings to illustrate the present invention and the conventional technique, the parts with the same function are identified by the same reference numerals.

Example 1

Figure 2A:
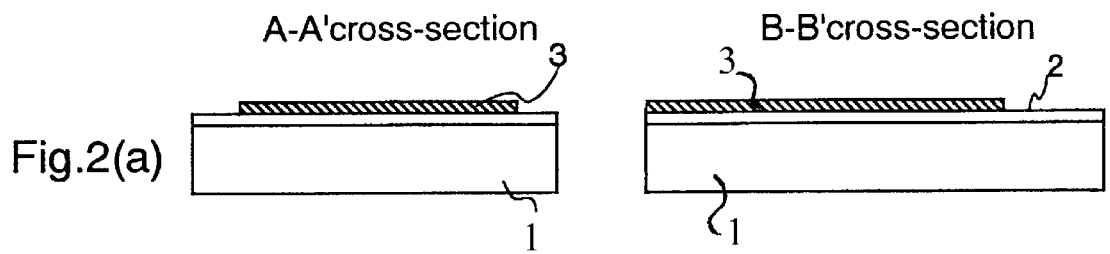
FIGS. 2(a)–(f) are two series of cross-sectional views illustrating the steps of a manufacturing method of a liquid crystal display device that is another embodiment of the present invention, with one series being cross-sectional views of the pixel structure taken along the line I–I of FIG. 1 and the other series, taken along the line II–II.

An example in which a structure shown in FIG. 1 is formed is described. FIGS. 2(a) to 2(f) are two series of cross-sectional views illustrating the steps of a manufacturing method of the present example. A left series in the drawings are cross-sectional views taken along the line I–I of FIG. 1 (I–I cross-section), and a right series, taken along the line II–II of FIG. 1 (II–II cross-section). First, as shown in FIG. 2(a), an underlying insulating film 2 made of $SiO_2$ or such is formed on a glass substrate 1 by the LPCVD (Low-Pressure Chemical Vapor Deposition) method. This underlying film is a film set to prevent the impurities coming from the glass substrate to mingle in, and, hereat, formed to a thickness of 500 nm or so.

Next, an underneath light-shielding film 3 is formed on the underlying insulating film 2. The underneath light-shielding film 3, in itself, can be formed from any material that can cut off the reflected light coming from the side of the substrate. However, because annealing is performed at the time of polysilicon formation in a later step, the material that can stand heat, such as WSi, is employed. Regarding the film thickness of the underneath light-shielding film 3, if formed from WSi, a thickness not less than 100 nm is enough to provide the light-shielding effect, and a thickness not less than 160 nm is more preferable. While the maximum for the thickness is not specifically set and can be appropriately chosen according to design, it is normally preferable that the thickness thereof does not exceed 500 nm or so. Hereat, the film is formed to a thickness of 175 nm or so by the sputtering method. Subsequently, the film is formed into a prescribed pattern, and, hereat, patterning is performed by the well-known method of lithography so as to form, in active-layer formation area of the TFT, a pattern that has a width of 2.5 μm for each side from the center of the active layer in the direction of the channel width.

Figure 2B:
Figure 2C:
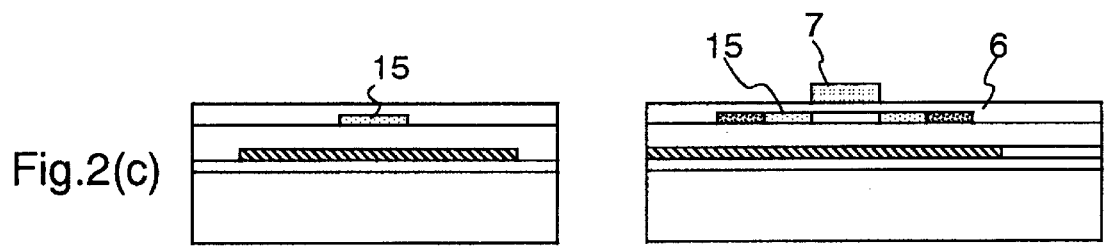

Next, as shown in FIG. 2(b), a first interlayer film 4 is formed. For this, for example, $SiO_2$ or the like that is formed by the PCVD (Plasma CVD) method using TEOS (Tetra-Ethyl-Ortho-Silicate) as a material is utilized. The film thickness of the first interlayer film 4 is preferably set to be not less than 500 nm so as to prevent the underneath light-shielding film 3 from acting as a back-gate for the TFT. While the maximum for the thickness is not specifically set and can be appropriately chosen according to design, it is normally preferable that the thickness thereof does not exceed 2 μm or so. Hereat, the first interlayer film is formed to a thickness of 1 μm or so.

Subsequently, in order to form an active layer of the TFT, a-Si containing a small amount of boron is formed to a thickness of 75 nm by the LPCVD method. Formation of a-Si containing a small amount of boron can be made, for example, by performing vapor-phase doping of boron to a dose in the range between 1E-17 and 5E-17/cm³, while growing a-Si. The a-Si layer grown in this way is then subjected to an irradiation by an excimer laser with an intensity of 400 mJ at room temperature, and, being crystallized, polysilicon 5 that is to serve as an active layer is formed. Further, as a first gate insulating film, SiO₂ (not shown in the drawings) is grown to a thickness of 10 nm or so by the LPCVD method. Following this, the steps of photolithography and etching are carried out and the layered structure of the polysilicon and the first gate insulating film is patterned into the form of an island.

Next, in order to form source-drain-regions, a photoresist pattern is formed on the first gate insulating film and, using this as a mask, phosphorus (P) is introduced thereinto under the conditions that an accelerating voltage is 30 keV and a dose is 3E+15 atoms/cm². Subsequently, a SiO₂ film is formed as a second gate insulating film to a thickness of 90 nm by the PCVD method using TEOS as the material (The above-mentioned first gate insulating film and the second gate insulating film together are referred to as a gate insulating film 6, hereinafter). Over this, an n⁺ uni-crystalline silicon (uc-n⁺ Si) that is to serve as a gate line 7 containing a gate electrode is formed to a thickness of 70 nm and, then, by the sputtering method, WSi is formed to a thickness of 100 nm, both of which are patterned into the form of a gate electrode and a gate line. Further, using the gate line 7 as a mask, ion implantation is performed to form LDD regions 15 (FIG. 2(c)). Although, in the present example, an instance in which the formation of the source-drain is carried out prior to the formation of the gate line is described, the present invention is in no way limited to this. The formation of the source-drain can be performed after the formation of the gate line, or after the formation of the LDD regions. Further, the LDD regions can be formed prior to the formation of the gate line and a gate-overlap structure in which some portion of the gate electrode overlap the LDD regions can be made. Moreover, the formation of the LDD regions itself is not essential for the present invention, although preferable.

Figure 2D:
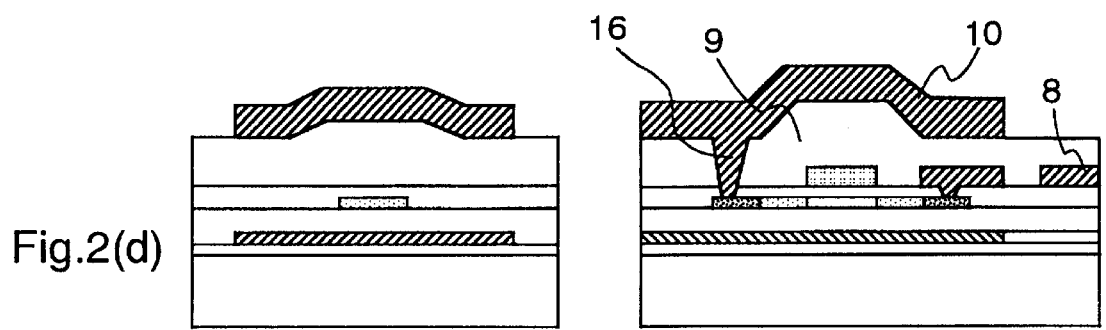
Figure 2E:
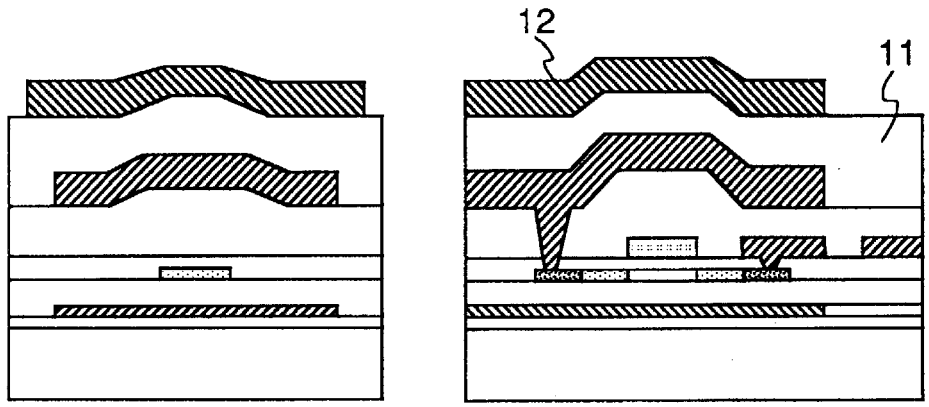

Next, as shown in FIG. 2(d), after a drain electrode 8 is formed, a second interlayer film 9 is formed, in the same manner as the first interlayer film 4, to a thickness of approximately 400 nm, and then a contact 16 to connect with the source region is formed by means of well-known photolithography. Further, a metal material such as titanium/aluminum is grown by the sputtering method and a data line 10 (with a thickness of 400 nm) is formed therefrom by dry etching. In this example, the contact 16 formed in the source region directly connects with the data line, but a source electrode can be formed as the drain electrode and through this source electrode, the connection can be made therebetween. Further, the present invention is not limited to the structure shown in the drawings, in which the drain electrode (and the source electrode) formed on the gate insulating film is connected through the contact with the data line. An electrode can be formed right in the drain region (and the source region) with a gate insulating film formed thereon. Alternatively, a second interlayer film can be made to have a double-layered structure, in which these electrodes are formed on the first lower layer and the data line, on the second upper layer. The present invention can also employ other various structures. It will be obvious to those skilled in the art such modifications and variations can be made appropriately without departing from the spirit and scope of the invention. Now, patterning is applied to the active-layer formation area of the TFT so that the width of the data line 10 may be made substantially the same as the width of the underneath light-shielding film. In patterning for the data line, if, in the active-layer formation area of the TFT, a mask having the same width as the underneath light-shielding film is formed and dry etching is applied thereto, the difference between the widths of the underneath light-shielding film and the data line is well contained within the range of ±0.3 μm that is the range of the production error as described above. Further, in the case that the width of the mask at the time of the data line formation is made slightly narrower than the width of the underneath light-shielding film, the overhang section of the data line can be reduced as much, which often works favorably. Subsequently, as shown in FIG. 2(e), a third interlayer film 11 and a black matrix 12 are formed, in succession. For instance, the third interlayer film 11 is formed from SiN to a thickness of 400 nm by the PCVD method and the black matrix 12 is formed from aluminum to a thickness of 400 nm.

Figure 2F:
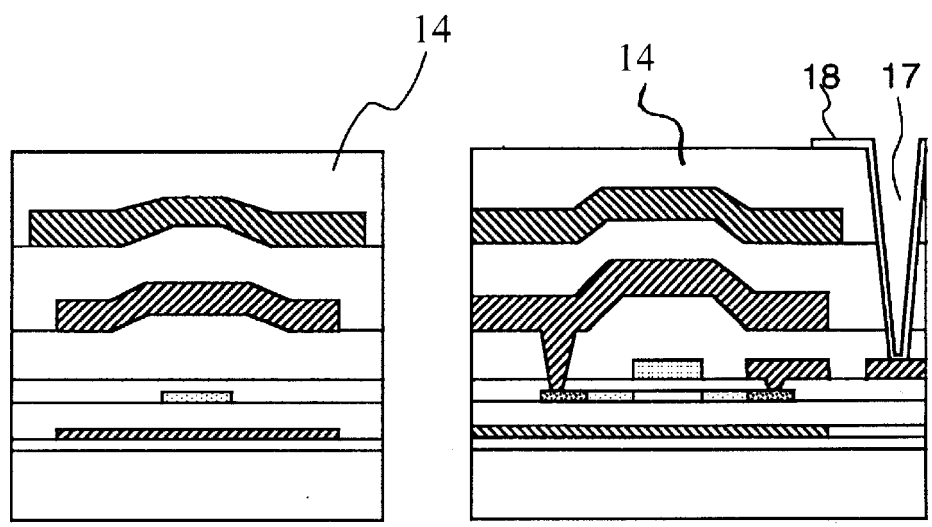

Following this, as shown in FIG. 2(f), using a resin material such as polyimide, an organic planarizing film 14 is formed to a thickness of 0.5 μm, and, then, a contact 17 between the ITO and the TFT is made open by dry etching and an ITO electrode 18 is formed by the sputtering method. Finally, a sputtering SiO₂ film is formed as a passivation film and other treatments such as terminal etching, backside etching and the like are applied thereto, and thereby a TFT substrate is accomplished. Further, by sticking together this substrate with the opposite substrate by a well-known method and injecting a liquid crystal between these substrates, a liquid crystal panel is fabricated.

Comparative Example 1

Another liquid crystal panel was manufactured in the same way as Example 1 except that the width of the data line was set constant throughout, that is, the width of the data line in the channel region of the TFT was set to be 1.5 μm each for both sides from the center of the channel.

For the liquid crystal panels obtained in Example 1 and Comparative Example 1, an irradiation of a blue light, which is the main factor to cause the generation of the optical leakage current, was applied from the side of the glass substrate 1 (under the assumption that the reflected light comes from the optical system) and the change of the leakage current with the illumination intensity was measured. The results are shown in FIG. 3.

Figure 3:
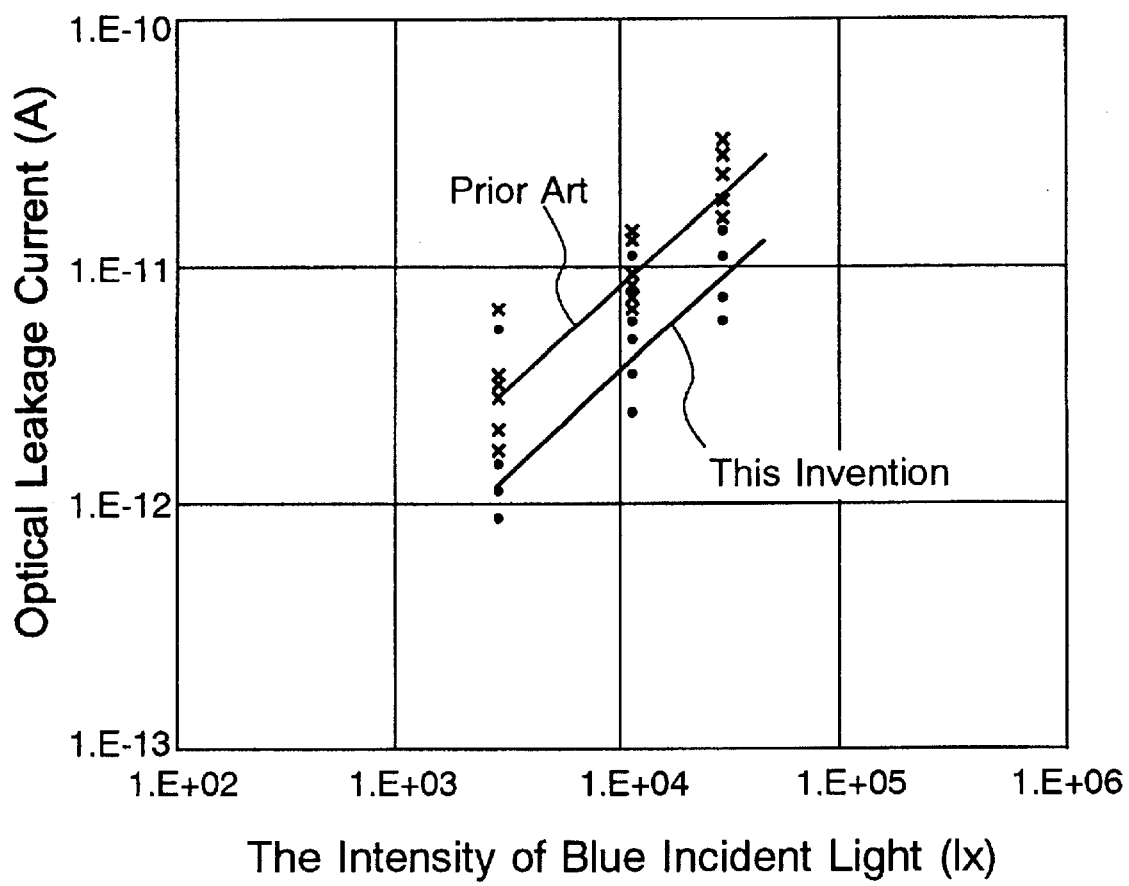
FIG. 3 is graphs showing the relationship between the optical leakage current and the intensity of blue incident light.
Figure 4:
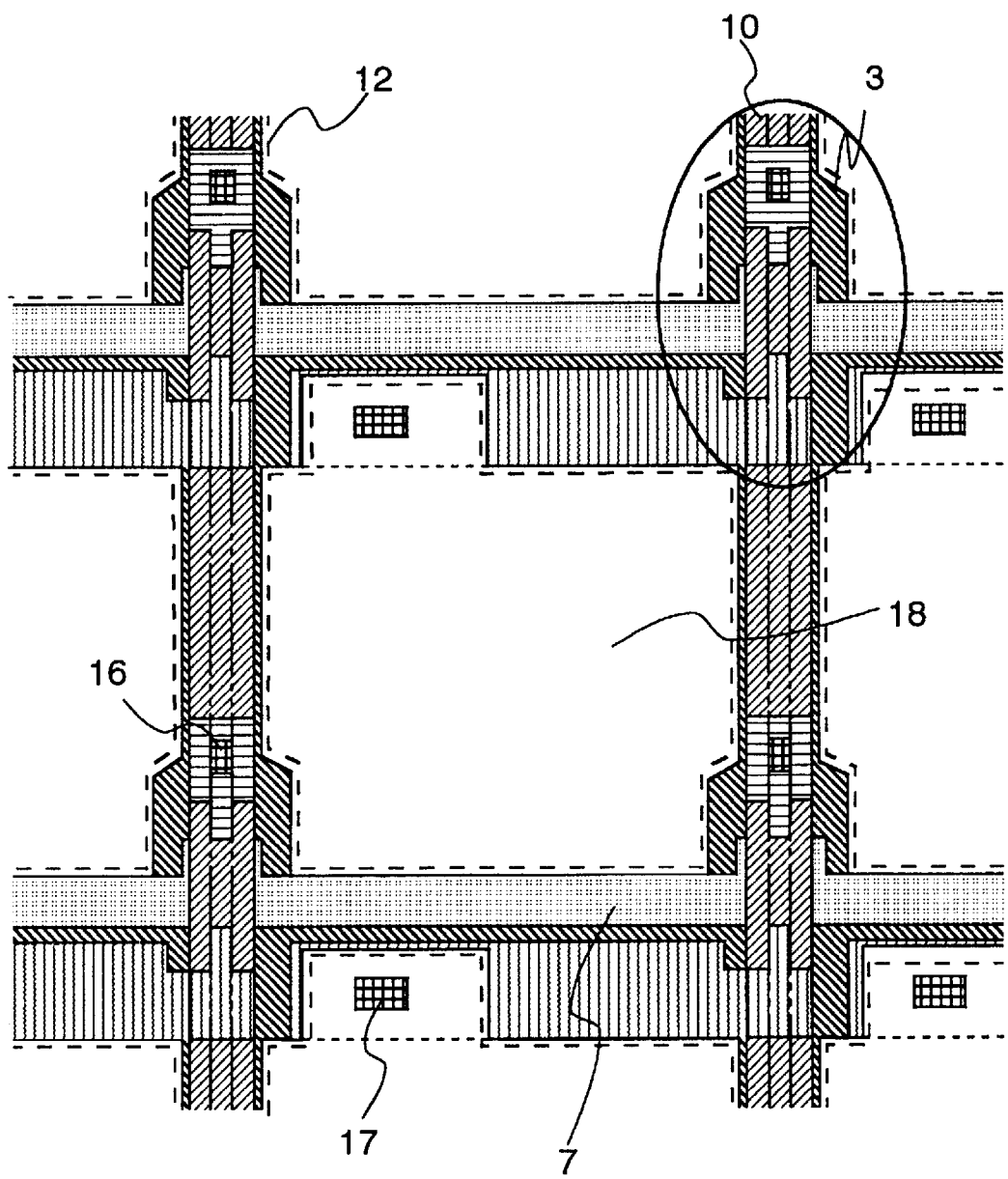
FIG. 4 is a plan view in explaining the conventional pixel structure.
Figure 5:
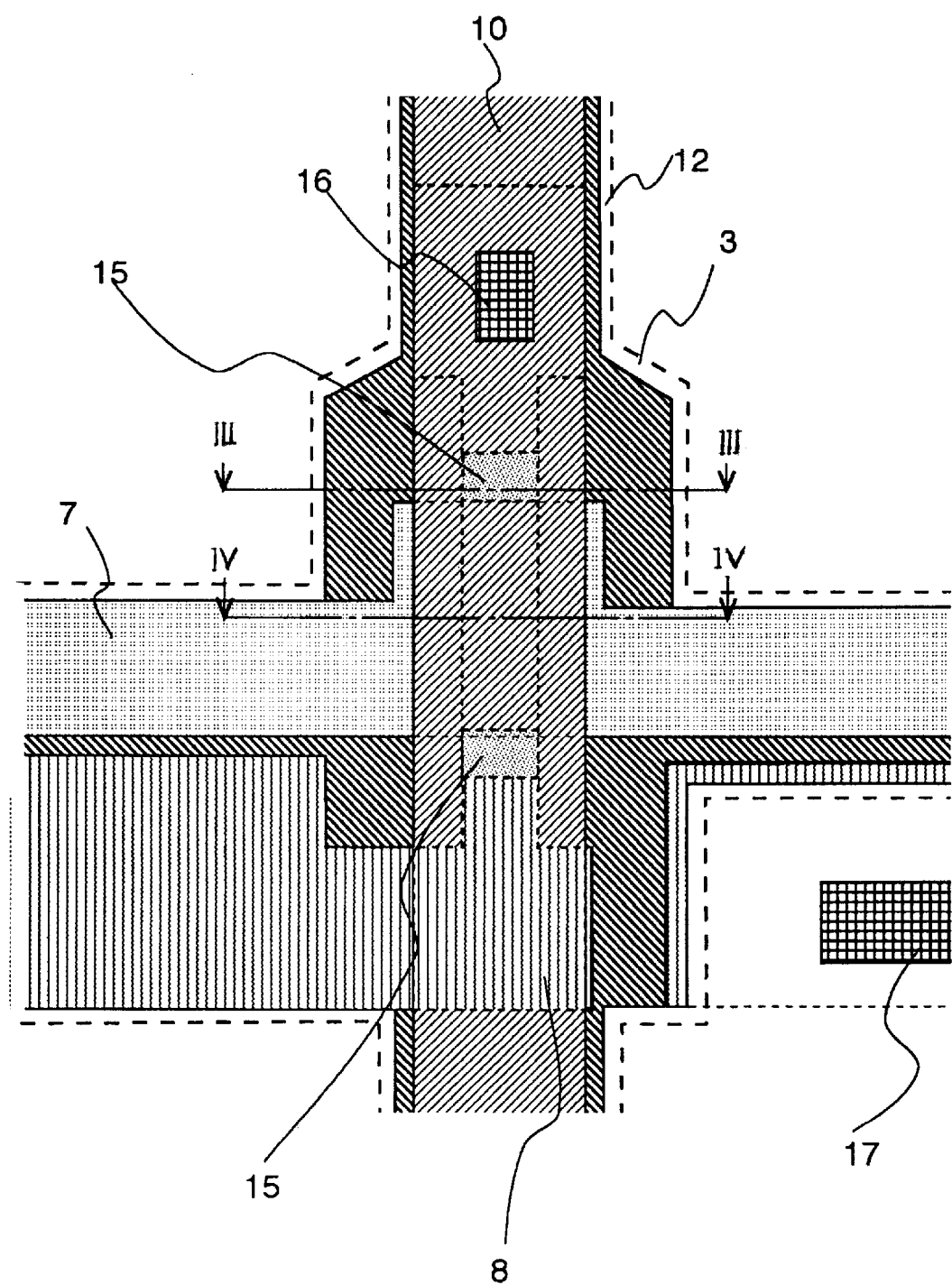
FIG. 5 is an enlarged fragmentary view of the pixel structure shown in FIG. 4.
Figure 6A:
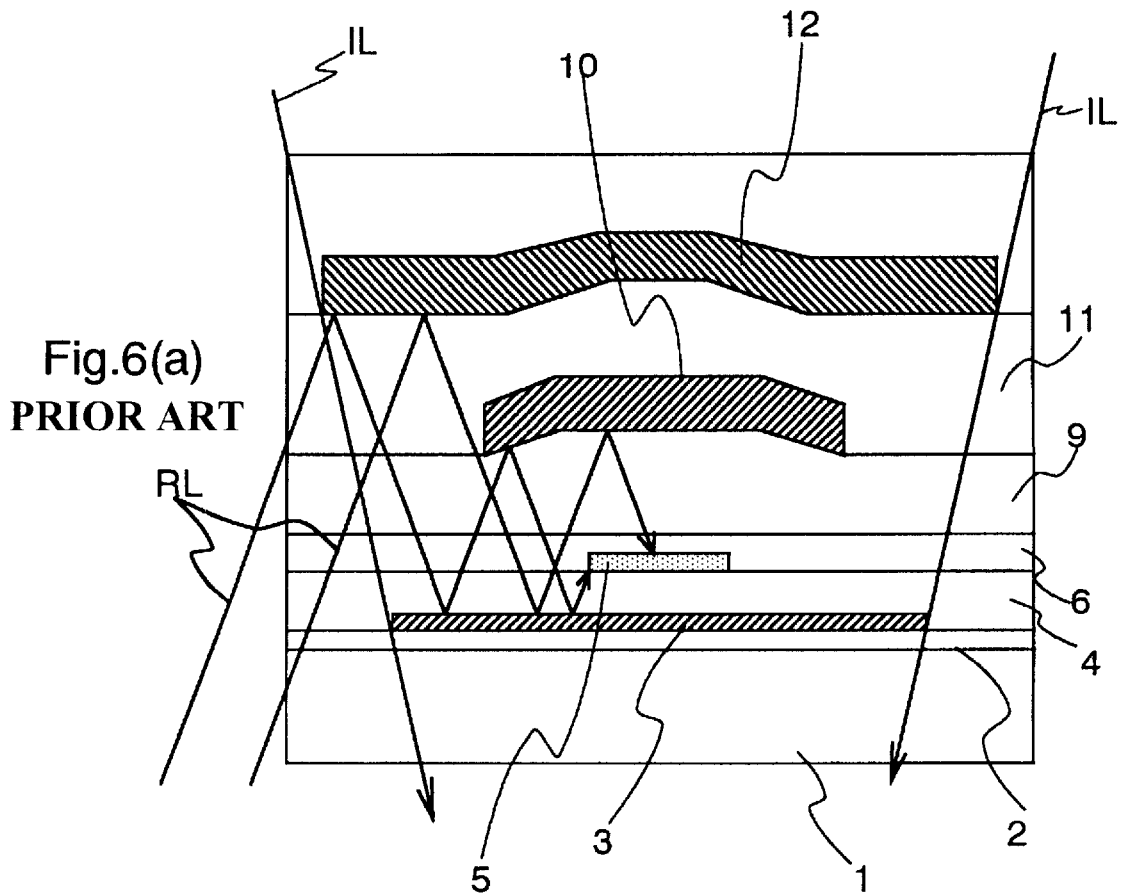
FIG. 6(a) is a cross-sectional view of the pixel structure taken along the line III–III of FIG. 5
Figure 6B:
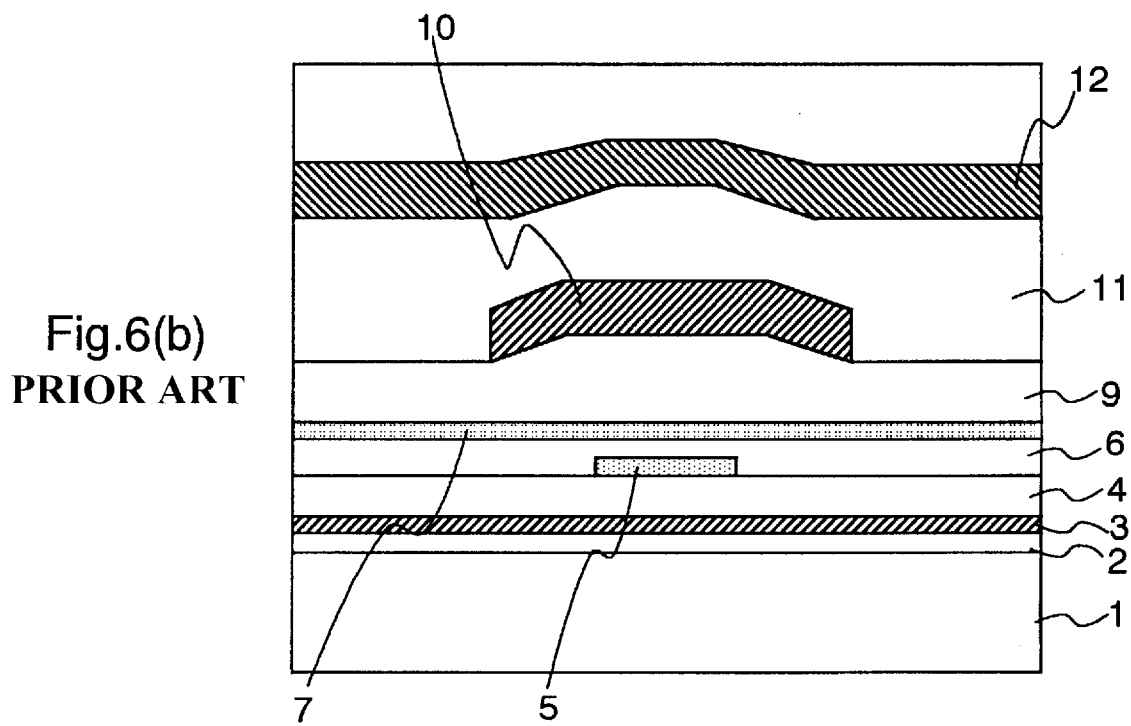
FIG. 6(b) is a cross-sectional view taken along the line IV–IV.

As clearly seen in FIG. 3, the leakage current for Example 1 (This Invention) is lower than that for Comparative Example 1 (Prior Art), which confirms the present invention has, indeed, a reducing effect on the leakage current.

What is claimed is:

1. A liquid crystal display device having, on a transparent insulating substrate:
   an underneath light-shielding film;
   a thin film transistor (TFT) in which, over an interlayer film on said underneath light-shielding film, an active layer made of polysilicon, a gate insulating film and a gate electrode connected with the gate line are successively formed;
   a data line that feeds the data signals into said TFT; and
   a black matrix formed over said data line to cut off the incident light;
   with said active layer of the TFT being formed in the region where said gate line and data line intersect each other; wherein:
   the underneath light-shielding film and the data line are formed to have substantially equal widths., at least, in said active-layer formation area.

2. The liquid crystal display device according to claim 1, wherein the tolerance between the widths of the underneath light-shielding film and the data line in the active-layer formation area of said TFT is −0.5 μm to +0.3 μm.

3. The liquid crystal display device according to claim 2, wherein the tolerance between the widths of the underneath light-shielding film and the data line in the active-layer formation area of said TFT is within the range of the production error.

4. The liquid crystal display device according to claim 1, wherein the width of the underneath light-shielding film in the active-layer formation area of said TFT is such that the distance between an end section of the TFT active layer in the direction of the channel width to an end section of the underneath light-shielding film is not less than 1.0 μm.

5. The liquid crystal display device according to claim 1, wherein said underneath light-shielding film is formed from a conductive material and controlled by an electric potential with a voltage being applied.

6. The liquid crystal display device according to claim 1, wherein said data line and black matrix are formed from an aluminium-based metal material.

7. A method of manufacturing a liquid crystal display device; which comprises the steps of forming, on a transparent insulating substrate, in succession, an underneath light-shielding film, a first interlayer film, a polysilicon that is to serve as an active layer of a thin film transistor (TFT), a gate insulating film, a gate line containing a gate electrode section, a second interlayer film, a data line, a third interlayer film and a black matrix; wherein:

the underneath light-shielding film and the data line-are formed to have substantially equal widths, at least, in said active-layer formation area.

8. The method of manufacturing a liquid crystal display device according to claim 7, wherein patterning of the data line in said active-layer formation area is carried out, using, as a mask, a pattern that has the same width as the underneath light-shielding film in the area.

9. The method of manufacturing a liquid crystal display device according to claim 7, wherein patterning of the data line in said active-layer formation area is carried out, using, as a mask, a pattern with a width set smaller than the width of the underneath light-shielding film in the area by a distance not exceeding 0.2 μm.

* * * * *